(12) United States Patent
Marinier et al.

(10) Patent No.: US 10,015,692 B2
(45) Date of Patent: Jul. 3, 2018

(54) PERFORMING MEASUREMENTS IN WIRELESS COMMUNICATIONS USING MULTIPLE CARRIERS

(71) Applicant: INTERDIGITAL PATENT HOLDINGS, INC., Wilmington, DE (US)

(72) Inventors: Paul Marinier, Brossard (CA); Ghyslain Pelletier, Montreal (CA); Kai Liu, Dublin, OH (US); Robert L. Olesen, Huntington, NY (US); Peter S. Wang, E. Setauket, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 157 days.

(21) Appl. No.: 14/981,234

(22) Filed: Dec. 28, 2015

(65) Prior Publication Data

US 2016/0119808 A1 Apr. 28, 2016

Related U.S. Application Data

(63) Continuation of application No. 14/248,066, filed on Apr. 8, 2014, now Pat. No. 9,226,188, which is a continuation of application No. 12/976,164, filed on Dec. 22, 2010, now Pat. No. 8,718,568.

(Continued)

(51) Int. Cl.
*H04L 12/26* (2006.01)
*H04W 24/10* (2009.01)
(Continued)

(52) U.S. Cl.
CPC ....... *H04W 24/10* (2013.01); *H04W 36/0083* (2013.01); *H04W 76/27* (2018.02)

(58) Field of Classification Search
None
See application file for complete search history.

(56) References Cited

U.S. PATENT DOCUMENTS

| 5,745,578 A | 4/1998 | Hassan et al. |
| 5,881,226 A | 3/1999 | Veneklase |
| (Continued) | | |

FOREIGN PATENT DOCUMENTS

| CN | 101516100 A | 8/2009 |
| CN | 101605352 A | 12/2009 |
| (Continued) | | |

OTHER PUBLICATIONS

3rd Generation Partnership Project (3GPP), R2-083329, "Discussion on Measurement Reporting", LGE, 3GPP TSG-RAN WG2 #62bis, Warsaw, Poland, Jun. 30-Jul. 4, 2008, 5 pages.

(Continued)

*Primary Examiner* — Chi H Pham
*Assistant Examiner* — Fahmida Chowdhury
(74) *Attorney, Agent, or Firm* — Condo Roccia Koptiw LLP

(57) ABSTRACT

Methods and systems to configure and/or reconfigure measurement configuration in wireless communications with one or more cells are disclosed. Measurement configuration reporting may be reconfigured based on events associated with the one or more serving cells and/or one or more serving component carriers, among others. Measurement configuration and measurement configuration reporting may also be reconfigured based on events associated with one or more serving component carriers.

14 Claims, 9 Drawing Sheets

Related U.S. Application Data

(60) Provisional application No. 61/289,887, filed on Dec. 23, 2009, provisional application No. 61/329,629, filed on Apr. 30, 2010, provisional application No. 61/388,876, filed on Oct. 1, 2010.

(51) Int. Cl.
*H04W 36/00* (2009.01)
*H04W 76/27* (2018.01)

(56) References Cited

U.S. PATENT DOCUMENTS

| | | |
|---|---|---|
| 8,358,625 B2 | 1/2013 | Koskinen |
| 8,385,920 B2 | 2/2013 | Iwamura |
| 8,718,568 B2 | 5/2014 | Marinier et al. |
| 2002/0071480 A1 | 6/2002 | Marjelund et al. |
| 2002/0118778 A1 | 8/2002 | Sipila |
| 2003/0236098 A1 | 12/2003 | Hayoun |
| 2004/0088558 A1 | 5/2004 | Candelore |
| 2004/0152458 A1 | 8/2004 | Hottinen |
| 2006/0023653 A1 | 2/2006 | Montalbano |
| 2007/0184838 A1 | 8/2007 | Van Der Velde et al. |
| 2008/0167041 A1 | 7/2008 | Wang et al. |
| 2009/0180447 A1* | 7/2009 | Kim ............... H04W 24/10 370/338 |
| 2009/0247150 A1* | 10/2009 | Fischer ............... H04W 24/10 455/425 |
| 2010/0195582 A1 | 8/2010 | Koskinen |
| 2010/0285806 A1 | 11/2010 | Iwamura |
| 2010/0296467 A1 | 11/2010 | Pelletier et al. |
| 2011/0098034 A1 | 4/2011 | Iwamura |
| 2012/0088509 A1 | 4/2012 | Yi |
| 2012/0115463 A1 | 5/2012 | Weng et al. |
| 2012/0176950 A1 | 7/2012 | Zhang et al. |
| 2012/0250578 A1 | 10/2012 | Pani et al. |
| 2012/0281566 A1 | 11/2012 | Pelletier et al. |
| 2013/0065594 A1 | 3/2013 | Somasundaram et al. |

FOREIGN PATENT DOCUMENTS

| | | |
|---|---|---|
| EP | 1773009 A2 | 4/2007 |
| JP | 2009-147910 A | 7/2009 |
| JP | 2009-165157 A | 7/2009 |
| TW | 2009-48147 A | 11/2009 |
| WO | WO 2008/157573 A1 | 12/2008 |
| WO | WO 2009/020926 A1 | 2/2009 |
| WO | WO 2009/120125 A1 | 10/2009 |
| WO | WO 2009/132246 A2 | 10/2009 |
| WO | WO 2009/137180 A2 | 11/2009 |

OTHER PUBLICATIONS

3rd Generation Partnership Project (3GPP), R2-093157, "Discussion on Active Sets and Measurements in DC-HSUPA", Huawei, 3GPP TSG RAN WG2 Meeting #66, San Francisco, U.S.A., May 4-8, 2009, 4 pages.

3rd Generation Partnership Project (3GPP), R2-096495, "Measurement Consideration in CA", Huawei, 3GPP TSG-RAN2 #68 meeting, Jeju, Korea, Nov. 9-13, 2009, 4 pages.

3rd Generation Partnership Project (3GPP), R2-096545, "Measurement Report Triggering in Carrier Aggregation", Potevio, 3GPP TSG-RAN WG2 Meeting #68, Jeju, Korea, Nov. 9-13, 2009, 5 pages.

3rd Generation Partnership Project (3GPP), R2-096800, "Measurement Considerations for Multicarrier Operation", Qualcomm Europe, 3GPP TSG-RAN WG2 meeting#68, Jeju, South Korea, Nov. 2009, 3 pages.

3rd Generation Partnership Project (3GPP), R2-096832, "Connected Mode Measurement for Carrier Aggregation", Alcatel-Lucent, 3GPP TSG-RAN WG2 Meeting #68, Jeju, Korea, Nov. 9-13, 2009, 3 pages.

3rd Generation Partnership Project (3GPP), R2-097017, "Measurement Configuration Structure for Carrier Aggregation", LG Electronics Inc., 3GPP TSG-RAN2 Meeting #68, Jeju, Korea, Nov. 9-14, 2009, pp. 1-5.

3rd Generation Partnership Project (3GPP), Tdoc R2-101996, "Event Handling at PCC Change", 3GPP TSG-RAN WG2 #69bis, Ericsson, Beijing, China, Apr. 12-16, 2010, 2 pages.

3rd Generation Partnership Project (3GPP), Tdoc R2-101998, "Carrier Aggregation and the s-Measure Criterion", Ericsson, 3GPP TSG-RAN WG2 #69bis, Beijing, China, Apr. 12-16, 2010, 4 pages.

3rd Generation Partnership Project (3GPP), TR 36.912 V9.1.0, "Technical Specification Group Radio Access Network, Feasibility Study for Further Advancements for E-UTRA (LTE-Advanced) (Release 9)", Dec. 2009, pp. 1-57.

3rd Generation Partnership Project (3GPP), TS 36.331 V8.6.0, "Technical Specification Group Radio Access Network, Evolved Universal Terrestrial Radio Access (E-UTRA) Radio Resource Control (RRC), Protocol Specification (Release 8)", Jun. 2009, pp. 1-207.

3rd Generation Partnership Project (3GPP), TS 36.331 V8.7.0, "Technical Specification Group Radio Access Network, Evolved Universal Terrestrial Radio Access (E-UTRA) Radio Resource Control (RRC), Protocol Specification (Release 8)", Sep. 2009, pp. 1-208.

3rd Generation Partnership Project (3GPP), TS 36.331 V9.0.0, "Technical Specification Group Radio Access Network, Evolved Universal Terrestrial Radio Access (E-UTRA) Radio Resource Control (RRC), Protocol Specification (Release 9)", Sep. 2009, pp. 1-213.

Aono et al., "Wireless Secret Key Generation Exploiting Reactance-Domain Scalar Response of Multipath Fading Channels", IEEE Transactions on Antennas and Propagation, 53(11), Nov. 2005, pp. 3776-3784.

European Telecommunications Standards Institute (ETSI), TS 136 331 V8.6.0, "Evolved Universal Terrestrial Radio Access (E-UTRA), Radio Resource Control (RRC), Protocol Specification (3GPP TS 36.331 version 8.6.0 Release 8 )", Jul. 2009, 30 pages.

* cited by examiner

514 — configure the at least one condition to include a first quality measurement associated with a first cell serving the WTRU at the first frequency becoming less than a second quality measurement associated with a second cell neighboring the first cell, the at least one condition further including a third quality measurement being greater then a threshold, the third quality measurement being associated with a third cell at the one or more frequencies on which the WTRU is configurable to operate, other than the first frequency 516 — configure the at least one condition to include a first quality measurement associated with a first cell at the first frequency becoming less than a second quality measurement associated with a second cell neighboring the first cell, the at least one condition further including a third quality measurement being greater than a threshold, the third quality measurement being associated with a third cell at the one or more frequencies on which the WTRU is configurable to operate, other than the first frequency

FIG. 5A

PERFORMING MEASUREMENTS IN WIRELESS COMMUNICATIONS USING MULTIPLE CARRIERS

CROSS REFENCE TO RELATED APPLICATIONS

This application is a continuation of U.S. patent application Ser. No. 14/248,066, titled "PERFORMING MEASUREMENTS IN WIRELESS COMMUNICATIONS USING MULTIPLE CARRIERS", filed Apr. 8, 2014, which is a continuation of 12/976,164, titled "PERFORMING MEASUREMENTS IN WIRELESS COMMUNICATIONS USING MULTIPLE CARRIERS", filed Dec. 22, 2010, which issued as U.S. Pat. No. 8,718,568 on May 6, 2014, which claims the benefit of U.S. Provisional Application No. 61/289,887, filed Dec. 23, 2009, titled "METHOD AND APPARATUS FOR MEASUREMENTS IN WIRELESS COMMUNICATIONS USING MULTIPLE CARRIERS", U. S. Provisional Application No. 61/329,629, filed Apr. 30, 2010, titled "METHOD AND APPARATUS FOR PERFORMING MEASUREMENTS IN WIRELESS COMMUNICATIONS USING MULTIPLE CARRIERS", and U.S. Provisional Application No. 61/388,876, filed Oct. 1, 2010, titled "PERFORMING MEASUREMENTS IN WIRELESS COMMUNICATIONS USING MULTIPLE CARRIERS", the contents of all of which being hereby incorporated by reference as if fully set-forth herein, for all purposes.

BACKGROUND

Wireless transmit/receive units (WTRUs) may perform intra/inter-frequency and inter-radio access technology (inter-RAT) measurements for mobility purposes. Intra-frequency measurements may be performed by the WTRU on the same carrier frequency as its current serving cell. The WTRU may carry out such measurements without measurement gaps. Inter-frequency neighbor or cell measurements may be performed by the WTRU on a carrier frequency different from the current serving cell. The WTRU may not to be able to carry out such measurements without measurement gaps. Measurement gaps may be periods during which the WTRU may not make or receive any transmissions on the frequency of the serving cell. Inter-RAT measurements may be performed by the WTRU on a carrier frequency used by another RAT, perhaps other than the one that may be used by the WTRU in the current serving cell.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to limitations that solve any or all disadvantages noted in any part of this disclosure.

Methods, systems, and apparatus may be used to reduce signaling overhead due to measurement configuration in wireless communications with multiple carriers. The method may be based on transmission of one or more reports of measurements triggered by various events.

Embodiments contemplate that a wireless transmit/receive unit (WTRU) may comprise a processor. The processor may be configured, at least in part, to determine a resource radio control (RRC) connection state and reconfigure a measurement configuration. The reconfiguration of the measurement configuration may include removing at least one parameter from the measurement configuration. The RRC connection state may be determined to be at least one of an RRC connection reestablishment or an RRC connection reconfiguration. Embodiments contemplate that the processor may be further configured to remove the parameter from the measurement configuration during at least one of the RRC connection reestablishment or the RRC connection reconfiguration. Also the processor may be further configured to remove the at least one parameter from the measurement configuration based on at least one condition.

Embodiments contemplate a wireless transmit/receive unit (WTRU) may comprise a processor. The processor may be configured, at least in part, to configure a measurement report based on at least one condition and the measurement report may include measurement results regarding one or more frequencies on which the WTRU may be configurable to operate. The processor may also be configured to transmit the measurement report. The measurement report may include measurement results regarding one or more frequencies on which the WTRU may be configurable to operate other than a first frequency. The first frequency may be associated with at least one condition. Embodiments contemplate that the at least one condition may include a signal quality of a carrier associated with the first frequency that may become less than a first threshold, and a signal quality of a carrier associated with the one or more frequencies on which the WTRU may be configurable to operate other than the first frequency being greater than a second threshold.

Embodiments contemplate a wireless transmit/receive unit (WTRU) that may comprise a processor. The processor may be configured, at least in part, to determine at least one condition that may be associated with one or more carriers. The WTRU may be configurable to operate on at least one of the one or more carriers. Also, the processor may be configured to transmit a measurement report based on the at least one condition. Embodiments contemplate that the at least one condition may include a quality measurement that may be associated with at least one of the one or more carriers becoming less than a threshold. The quality measurement may be at least one of a signal strength or a signal quality and the WTRU may be configurable to operate on the at least one of the one or more carriers on one or more frequencies.

BRIEF DESCRIPTION OF THE DRAWINGS

A more detailed understanding may be had from the following description, given by way of example in conjunction with the accompanying drawings wherein:

FIG. 5A is a block diagram of an exemplary measurement embodiment; and

DETAILED DESCRIPTION OF ILLUSTRATIVE EMBODIMENTS

Figure 1A:
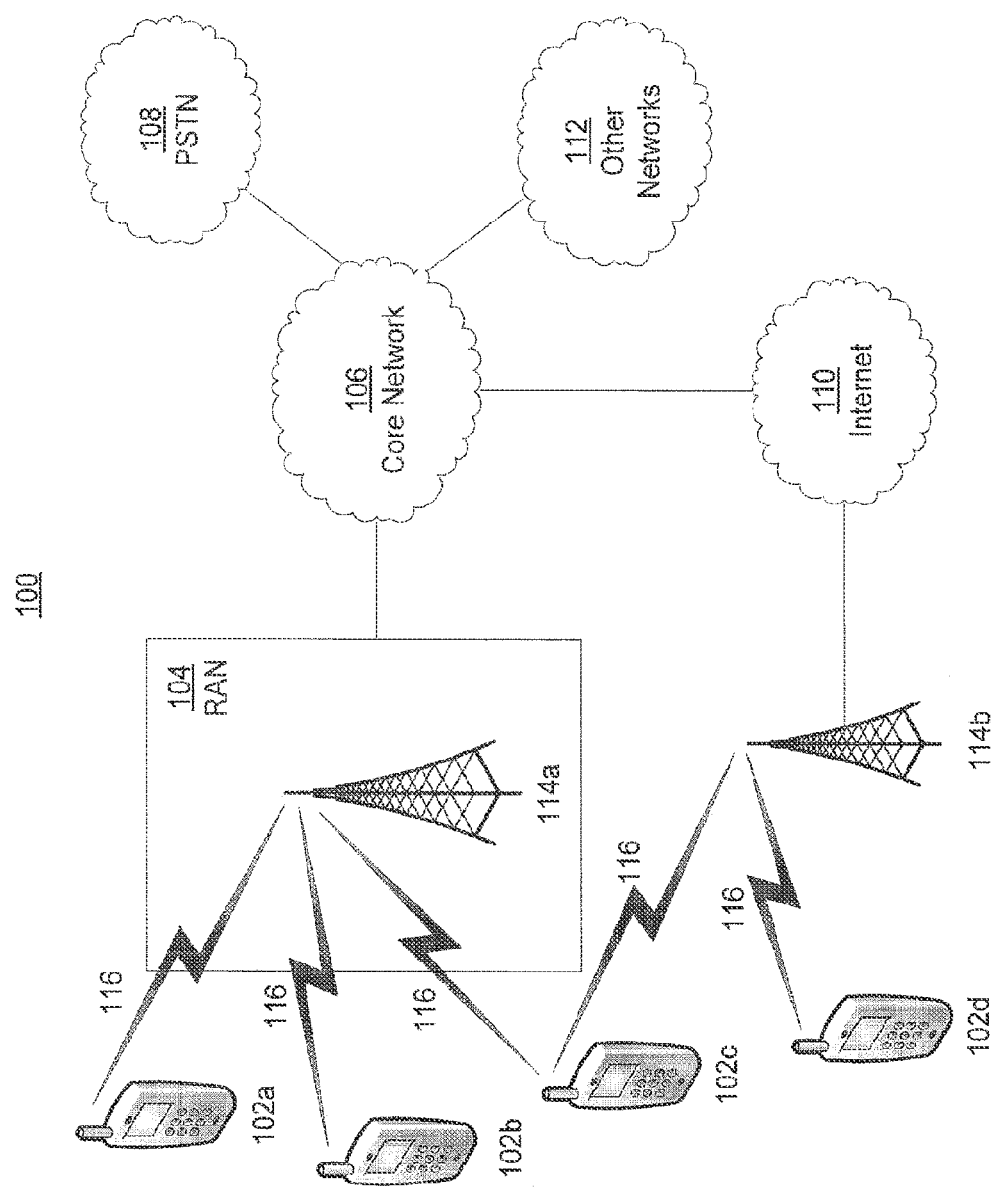
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit receive units (WTRUs) 102a, 102b, 102c, 102d, a radio access network (RAN) 104, a cute network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications system 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receiver wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example and may utilize any suitable RAT for facilitating wireless connectivity in a localized area, such as a place of business, a home a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
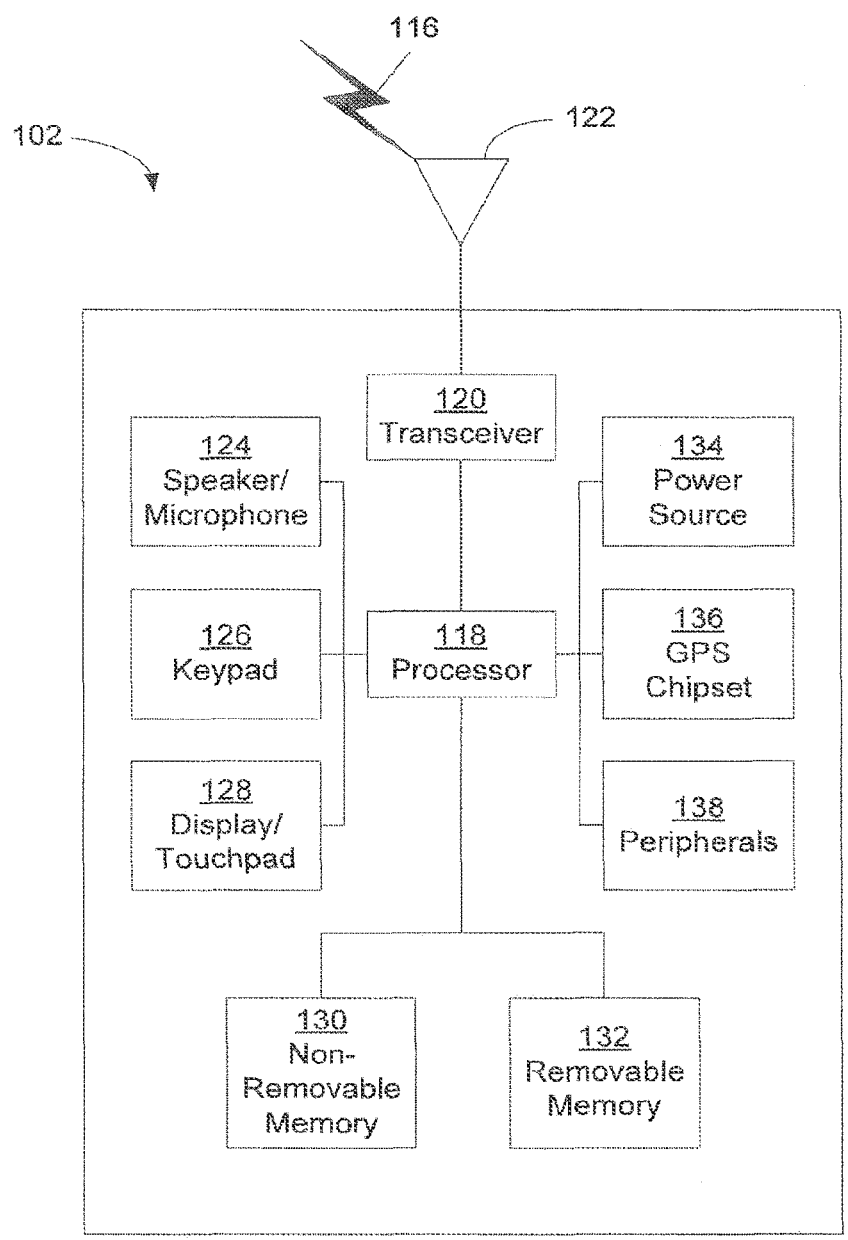
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and other peripherals 138. It will be appreciated that the WTRU 102 may include any subcombination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power controls, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removal memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hand free headset, a Bluetooth® module, a frequency modulated (FM) radio unit, a digital music player, a media player, a video game player module, an Internet browser, and the like.

Figure 1C:
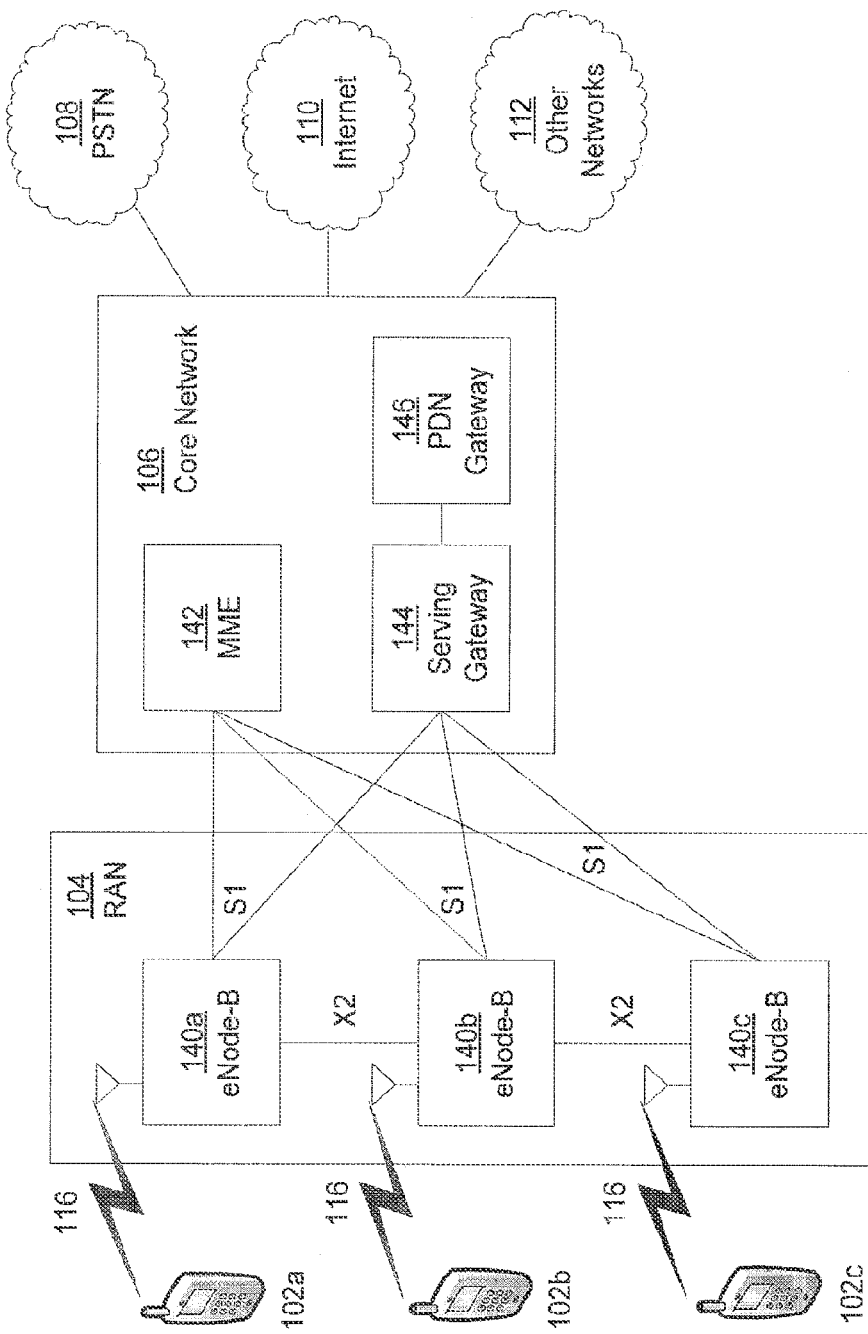
FIG. 1C is a system diagram of an example radio access network and an example core network that may be used within the communications system illustrated in FIG. 1A.

FIG. 1C is a system diagram of the RAN 104 and the core network 106 according to an embodiment. As noted, the RAN 104 may employ an E-UTRA radio technology to communicate with the WTRUs 102a, 102b, and 102c over the air interface 116. The RAN 104 may also be in communication with the core network 106.

The RAN 104 may include eNode-Bs 140a, 140b, 140c, though it will be appreciated that the RAN 104 may include any number of eNode-Bs while remaining consistent with an embodiment. The eNode-Bs 140a, 140b, 140c may each include one or more transceivers for communicating with the WTRUs 102a, 102b, 102c over the air interface 116. In one embodiment the eNode-Bs 140a, 140b, 140c may implement MIMO technology. Thus, the eNode-B 140a, for example, may use multiple antennas to transmit wireless signals to, and receive wireless signals from, the WTRU 102a.

Each of the eNode-Bs 140a, 140b, 140c may be associated with a particular cell (not shown) and may be configured to handle radio resource management decisions, handover decisions, scheduling of users in the uplink and/or downlink, and the like. As shown in FIG. 1C, the eNode-Bs 140a, 140b, 140c may communicate with one another over an X2 interface.

The core network 106 shown in FIG. 1C may include a mobility management gateway (MME) 142, a serving gateway 144, and a packet data network (PDN) gateway 146. While each of the foregoing elements are depicted as part of the core network 106, it will be appreciated that any one of these elements may be owned and/or operated by an entity other than the core network operator.

The MME 142 may be connected to each of the eNode-Bs 142a, 142b, 142c in the RAN 104 via an S1 interface and may serve as a control node. For example, the MME 142 may be responsible for authenticating users of the WTRUs 102a, 102b, 102c, bearer activation/deactivation, selecting a particular serving gateway during an initial attach of the WTRUs 102a, 102b, 102c, and the like. The MME 142 may also provide a control plane function for switching between the RAN 104 and other RANs (not shown) that employ other radio technologies, such as GSM or WCDMA.

The serving gateway 144 may be connected to each of the eNode Bs 140a, 140b, and 140c in the RAN 104 via the S1 interface. The serving gateway 144 may generally route and forward user data packets to/from the WTRUs 102a, 102b, 102c. The serving gateway 144 may also perform other functions, such as anchoring user planes during inter-eNode B handovers, triggering paging when downlink data is available for the WTRUs, 102a, 102b, 102c, managing and storing contexts of the WTRUs 102a, 102b, 102c, and the like.

The serving gateway 144 may also be connected to the PDN gateway 146, which may provide the WTRUs 102a, 102b, 102c with access to packet-switched networks, such as the Internet 110, to facilitate communications between the WTRUs 102a, 102b, 102c and IP-enabled devices.

The core network 106 may facilitate communications with other networks. For example, the core network 106 may provide the WTRUs 102a, 102b, 102c with access to circuit-switched networks, such as the PSTN 108, to facilitate communications between the WTRUs 102a, 102b, 102c and traditional land-line communications devices. For example, the core network 106 may include, or may communicate with, an IP gateway (e.g., an IP multimedia subsystem (IMS) server) that serves as an interface between the core network 106 and the PSTN 108. In addition, the core network 106 may provide the WTRUs 102a, 102b, 102c with access to the networks 112, which may include other wired or wireless networks that are owned and/or operated by other service providers.

The network may provide the WTRU with measurement configurations through dedicated radio resource control (RRC) signaling. Measurement configurations may include measurement objects that may correspond, for example in an LTE system, to a single frequency for intra/inter-frequency measurement; reporting configurations that may correspond to a list of reporting criterion and associated reporting format; measurement identities that may correspond to a list of identities that link one measurement object together with one reporting configuration; quantity configurations that may correspond to measurement quantities (which, for example, may be thresholds) and/or associated filtering to apply for events and reporting for one measurement type, or perhaps more than one measurement type; and measurement gap or gaps configuration or configurations.

In Evolved Universal Mobile Telecommunications System (UMTS) Terrestrial Radio Access Network (E-UTRAN), for example, a single measurement object may be configured on a per carrier frequency basis. Conceptually, for example, objects may be stored in a table, and different operations may be defined to add, remove and modify the table.

By way of example, at least one measurement identity may be associated with a single pair; (for example, at least one measurement object for one reporting configuration). In this example, the event reporting configuration may include a combination of one event, one hysteresis parameter and a time to trigger for a trigger type vent. The WTRU may be configured with multiple instances of the same event. This may provide the flexibility to reuse the same reporting configuration, such as the same trigger, for different measurement objects, such as for different frequencies, by linkage using different measurement identities. This may imply that different measurement identities may be used to link the same measurement object, such as a frequency, to different reporting configurations, such as multiple triggers.

Issues may arise when attempting to apply existing measurements framework to a WTRU employing carrier aggregation. An issue may be that the network may, for the purpose of managing de-configuration of component carriers, configure more than one measurement object (one per frequency, each including one reporting configuration and one measurement identity.

The use of similar or identical reporting configurations with different measurement object, such as for different frequencies, may result in near simultaneous multiple transmissions of measurement reports. Methods to minimize the additional overhead in signaling due to the measurement configuration when operating with multiple carriers are contemplated, for example where such methods may result in fewer measurement reports.

Embodiments contemplate that the quality and/or level of a signal received from a certain carrier may degrade, perhaps rapidly, for a WTRU operating with a single carrier or multiple carriers. This may happen for different reasons, such as for example, when the WTRU may be going out of coverage for this carrier, or may be getting close to an interfering home cell or femtocell on the same frequency. If the concerned carrier may have a special role with respect to the connection to the network, for example, if it corresponds to a special cell or a primacy serving cell in an existing method, loss of connectivity to the network may occur. To prevent this, the network may reconfigure the WTRU so that the primary serving cell corresponds to a carrier from which the signal quality may be acceptable. Such a reconfiguration may require that the network have information on the quality of the other carriers early enough after either the WTRU may measure the loss of quality of the carrier and/or the WTRU may be notified of the loss of quality of the carrier corresponding to the primary serving cell.

The WTRU, perhaps upon detecting that the signal quality and/or signal strength of the primacy serving cell is going below a threshold, may report measurement results pertaining to cells on the same frequency as this cell. Thus, the network may not obtain information about other cells immediately on the other frequencies, unless perhaps another event would independently have been triggered at the same time, or a periodic report would have been transmitted at about the same time for one of the other frequencies. The delay may result in the WTRU losing the connection to the network, even though this may have been avoided with a reconfiguration.

Similar issues may occur due to a configuration of cells on multiple component carriers (CCs) that may be included in a handover command. The network may not have the most recent measurement results on the other carriers on the target base station, except perhaps the one that may have triggered the measurement event reporting.

Embodiments contemplate that the network may determine, perhaps based on a requirement, when to add or remove serving cells from the configuration of a WTRU that may be capable of operating with multiple carriers. At least one factor in such a determination, especially perhaps in a scenario where the coverage area may be different between the different available carrier frequencies, may be the measurements taken from these carriers. In such scenarios, where feasible, the measurement results may be available at the right time.

Figure 2:
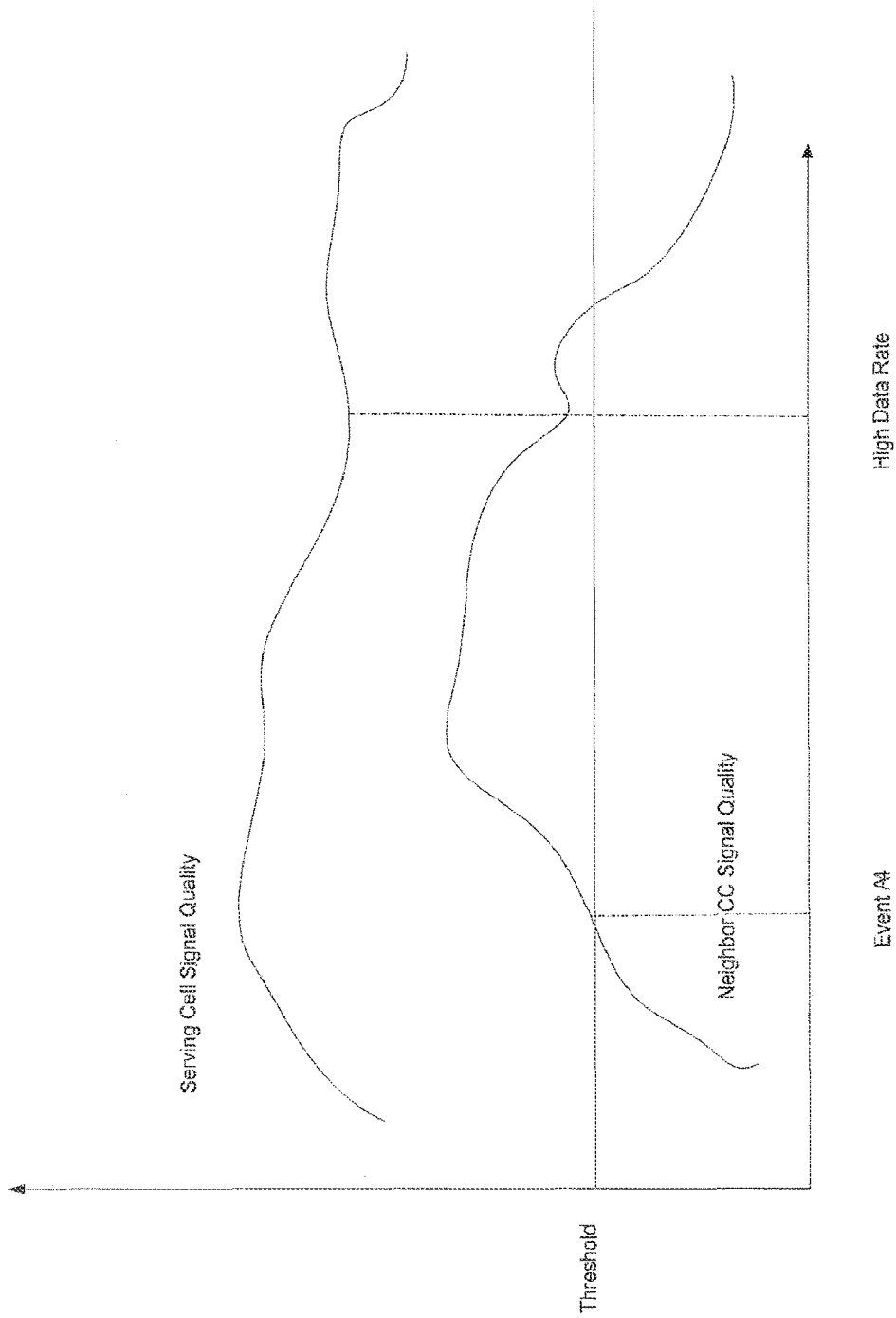
FIG. 2 is a diagram displaying signal quality.

For example, a measurement event may not exist to report deterioration in the quality of one of the configured carriers if at least one of the configured carriers drops below one or more thresholds. At least one view of this problem may be seen in FIG. 2. As illustrated in the example of FIG. 2, the WTRU may not require high data rates and therefore may continue to operate with a single carrier when the signal quality of a neighboring component carrier (CC) may become higher than (or rise above) a threshold. Also, subsequently, when the WTRU may require higher data rates, the network may not know whether the signal quality of the neighbor component carrier (CC) may be still good enough to be reconfigured, at least because no measurement event may exist to report that the neighboring component carrier (CC) may become lower than (or fall below) a threshold.

Typical procedures for the handling of measurement identities at an inter-frequency handover or re-establishment may not be directly applied to scenarios where the WTRU operates with multiple carriers in either the source or target configuration. For example, an issue may be that the swapping of measurement objects (MeasObjects) for each measurement identity (MeasId) corresponding to one or more events may result in meaningless configurations on some carriers. This may occur, for example, when the frequency corresponding to the primary component carrier (PCC) in the source configuration may not be a configured CC in the target configuration, while the frequency corresponding to the PCC in the target configuration may be a configured CC (i.e. a secondary component carrier (SCC) in the source configuration. In such a scenario, the swapping of measurement objects may result in meaningless events, such as "serving cell becoming higher than a threshold" on a frequency where there may be no serving cell. Meaningless events such as these, for example, may result in unnecessary measurements on certain frequencies.

A similar issue may arise in a reconfiguration where a frequency may be part of the source configuration as SCC, but not part of the target configuration. In such a case, assuming that the concerned measObject may not be involved in any swapping, meaningless events may end up in the target configuration.

Embodiments contemplate that the WTRU may be configured with an "S-Measure" parameter. The "s-Measure" parameter may, for example, be a quality threshold for the serving cell that may control whether or not the WTRU may, or perhaps be required, to perform measurements of intra-frequency, inter-frequency, and inter-RAT neighboring cells. By way of example, a multi-carrier WRTU may refrain from measuring on non-configured frequencies as long as the signal strength on the primary serving cell may be above a certain configured s-Measure. This may hinder the network for the eventual configuration of additional CCs for this WTRU.

A measurement configuration may include multiple measurement objects, such as for more than one component carrier or frequency. One or more methods may be used to minimize the possibility that a WTRU generates and transmits multiple measurement reports within a short period of time. This may be achieved, by way of example and not limitation, by grouping measurements, based on measurement identities. This may be achieved by applying logic governing a trigger condition for initiating the transmission of a measurement report.

Alternatively, minimizing the possibility that a WTRU generates and transmits multiple measurement reports within a short period of time may also be achieved by initiating transmission of one or more various types of reports. For example, at least one of these types may be a report of only the measurement or measurements for which an event was triggered. Another type may be a report for all measurements of the measurement group. Another type may be multiple reports, perhaps at the same time, each containing measurement results pertaining to a single measurement object. This latter type may be distinct from, and may have advantages in some scenarios over, the near-simultaneous transmission of multiple reports, since it may result in the transmission of reports in one transmission time interval (TTI). This may generally result in less overhead than if they are transmitted in different TTIs.

A measurement identity (measID) may be defined that associates one or more measurement objects (measObject), for example, a frequency, with one reporting configuration. A reporting configuration may include a list of criteria and reporting formats.

Embodiments contemplate a realization for multicarrier operation may be as follows: the measurement identity may be additionally configured with one new parameter representing the group of measurements (measGroupID), which may itself be associated with a type (measGroupType) indicating the triggering function to apply to the group of measurements.

The associated triggering function may be one of several types. At least one type of triggering function may be referred to as a default triggering function. When any one of the configured events belonging to a measurement object belonging to a measurement group may satisfy the reporting criteria, the WTRU may, perhaps immediately or with a predetermined delay, initiate one or more procedures to transmit a measurement report for the measurement group.

At least one type of triggering function may be referred to as a window-based triggering function. When any one of the configured events belonging to a measurement object of a measurement group may satisfy the reporting criteria, and if there is no pending measurement report for this measurement group, the WTRU may consider that this measurement report is pending and may wait for a certain period of time, (i.e. a window of time). Once the period ends and there is at least one pending measurement report, the WTRU may initiate a procedure to transmit a measurement report for the measurement group. The size of the window may be either a fixed value or may be configured by the network. The configuring may be performed using layer 3 (L3) signaling, such as radio resource control (RRC), for example.

Embodiments contemplate that at least one type of triggering function may be referred to as a cumulative window-based triggering function. When any one of the configured events belonging to a measurement object of a measurement group may satisfy the reporting criteria, and if there may be no pending measurement report for this measurement group, the WTRU may consider that this measurement report may be pending and may wait for a certain period of time, (e.g., a window of time). Once the period may end and if an event criterion for each measurement object of the measurement group may be satisfied, the WTRU may initiate a procedure or procedures to transmit a measurement report for the measurement group. The size of the window may be either a fixed value or may be configured by the network, for example. By way of example and not limitation, the configuring may be performed using L3 signaling, such as RRC.

Embodiments also contemplate that at least one type of triggering function may be referred to as a prohibited triggering function. When any one of the configured events belonging to a measurement object belonging to a measurement group may satisfy the reporting criteria, the WTRU may ignore the event if less than a specific amount of time, such as an amount determined by a prohibit timer, has elapsed since the transmission of a report for this measurement group. The amount of time may be either a fixed value or may be configured by the network, for example. By way of example and not limitation, the configuring may be performed using L3 signaling, such as RRC.

Embodiments contemplate that at least one type of triggering function may be referred to as a cascaded time-to-trigger triggering function. A time Tx may be defined as a delay before the WTRU may initiate transmission of a measurement report, that is, a time-to-trigger, for example. When any one of the configured events belonging to a measurement object in a measurement group satisfies the reporting criteria, the WTRU may, for example, start a first timer corresponding to a value T1. Before T1 may expire, the WTRU may complete an evaluation of other measurement objects in the measurement group that may be configured with a second timer, T2, where, for example, T2 may be smaller than T1. Upon expiration of time T1, the WTRU may report quantities for measurements that satisfy the event criteria in the same measurement report transmission.

The respective values of Tx may each be either a fixed value or may be configured by the network using, for example, L3 signaling such as RRC, for example, such that T1 and T2 may be multiples of the measurement occasion. This may reduce the fluctuation of different measurements for entering the time-to-trigger timers.

Embodiments contemplate that a parameter may be included to indicate whether or not only the measurement or measurements for which an event was triggered may be reported. For example, the WTRU may include in the transmission of the measurement report the quantities for some or all measurement objects of the measurement groups if the parameter may be true. If the parameter may not be true, the WTRU may report only the quantities for the measurement objects for which the event criteria may have been met. The parameter may be, for example, an allReportsInGroupEnabled parameter.

Embodiments contemplate that one or more issues may arise when the signal quality from a carrier may degrade rapidly, or when a handover to a target cell with multiple carriers may be required. The carrier in such an example may correspond to the primary serving cell or "Pcell."

In the disclosed examples, the terms "metric" may correspond to a quality measurement, such as either a received signal quality, such as Reference Signal Received Quality (RSRQ) for an LTE system, or a received signal strength, such as Reference Signal Received Power (RSRP) for an LTE system, for example and without loss of generality. the choice of the measurement metric may be configurable on a per-frequency basis. For example, the RSRP may be used for a first frequency while RSRQ may be used for a second frequency, or vice-versa.

When the WTRU may be operating with multiple carriers, the terminology "primary serving cell" may be used to designate a specific or unique carrier to which the WTRU may be configured. For example, the terms may correspond to the carrier corresponding to the "special cell", or "primary serving cell", or "Pcell." The terminology "serving cell" which could be a "primary serving cell" or "Pcell", or "secondary serving cell", or "Scell", for example, which may be used to designate any carrier to which the WTRU may be configured, on any frequency. The term "best cell" may refer to the measured cell that has the highest metric on the given frequency, regardless of whether it corresponds to a carrier that may be part of the WTRU configuration. Alternatively, best cell may be used to refer to the measured cell that may not be part of the WTRU configuration that may have the highest metric on the given frequency. The terminology may apply to the following example measurement events to support CC management.

For example, embodiments contemplate that the WTRU may send a measurement report that contains measurement results from a multiplicity of frequencies, or other measurement objects, when a certain event or one of a set of events may be triggered. The event or set of events may indicate that a reconfiguration may need to be performed. Alternatively, the WTRU may send a multiplicity of measurement reports, perhaps each containing measurement results from a single frequency or other measurement object when a certain event or one of a set of events may be triggered. The event or set of events may indicate that a reconfiguration may need to be performed. Using this approach, the network may immediately, or perhaps after a predetermined delay, obtain measurement results for cells or carriers on other frequencies that may be candidates for the reconfiguration.

Embodiments contemplate that events that may trigger the reporting of measurement results from multiple frequencies may be one or a subset of several types, for example. One example may be an event that may indicate degradation of signal quality on the primary serving cell, for example, an A2 event in which a primary serving cell metric may fall below a threshold or an A3 event in which a neighbor cell metric may be offset better (e.g., higher) than a primary serving cell metric.

Another example of a triggering event may be an extension of an event in which the primary serving cell may be replaced by a serving cell on a specified frequency. For example, in an extended A2 event, a serving cell metric on a particular frequency may fall below a threshold. As another example, in an extended A3 event, a neighbor cell metric may be offset better than a serving cell on a specified frequency. By way of example, the phrase "offset better" may be understood to mean higher or larger. Also by way of example, the expression "A is offset better than B" may be understood as the metric of A being larger than the metric of B by a value "offset."

Another example of a triggering event may be an event that indicates degradation of signal quality on a first serving cell while the signal quality on a second serving cell may remain above a threshold. For example, a primary serving cell metric may drop below a first threshold and a serving cell metric on a specific frequency may remain above a second threshold. In another example, a serving cell metric on a specific frequency may drop below a first threshold and serving cell metric on another specific frequency may remain above a second threshold. In yet another example, a neighbor cell metric may become offset better than a primary serving cell, and a serving cell metric on a specific frequency may remain above a second threshold. Alternatively, a neighbor cell metric may become offset better than a serving cell on a specific frequency and serving cell metric on another specific frequency may remain above a second threshold.

Another example of a triggering event may be similar to one or more of the previous examples, but instead of using a specific frequency (or specific standard frequency), any of a preconfigured set of frequencies, other than that of the primary serving cell or other standard frequencies based on the event, may be used. The preconfigured set of frequencies may be provided by higher layers or may correspond to the set of frequencies on which the WTRU may be configured to operate.

The measurement report or set of measurement reports transmitted by the WTRU upon a triggering of one of the above events may contain the measurement results for the following measurement objects, individually or in combination; the measurement object for the frequency corresponding to the primary serving cell; all or a subset of measurement objects of the measurement configuration, corresponding to frequencies on which the WTRU may be operating (e.g., frequencies with a configured Scell); all or a subset of measurement objects of the measurement configuration, corresponding to frequencies on which the WTRU may be operating, for which the serving cell metric may be above a threshold; all or a subset of measurement objects for which the strongest cell metric may be above a threshold; all or a subset of measurement objects included in the measurement configuration of the WTRU, regardless of which of the above events may have been triggered; or all or a subset of measurement objects that may have been used in the evaluation of the event having triggered the report. The measurement object may refer to one type of measurement object (e.g., measObjectEUTRA, measObjectUTRA, measObjectGeran, or measObjectCDMA2000).

In a case where only a subset of measurement objects may be reported, the number of measurement objects may be determine using one or more of: up to K measurement objects in total; up to N measurement objects corresponding to carriers with a configured Scell; or up to M measurement objects corresponding to carriers with no configured Scell. Then the measurement results of up to C cells may be reported. N, M, C and K may be pre-defined or signaled by higher layers.

Embodiments contemplate that when a smaller number of objects may be selected compared to the number of objects for which measurements are available, the subset of objects may be selected using one or more of, or a combination of, a Rule 1—selecting the objects that may have the highest (or best) metric (RSRP/RSRQ) for their highest ranked cells; and/or a Rule 2—selecting the objects for which the metric of their highest ranked cells may be above a threshold. If the selected measurement objects by Rule 2 may exceed the max number of allowed measurement object, the Rule 1 may be applied.

The WTRU may send a measurement report to enable the removal of a carrier from the configuration or to notify the network that a carrier may no longer be considered for addition to the WTRU configuration. The WTRU may send the measurement report when one of several events occurs, for example when the signal strength or quality on the carrier may become too low for proper operation. Other examples may include when a serving carrier metric on a measurement object falls below an absolute threshold or a metric of a best cell on the measurement object may fall below an absolute threshold.

The following example events may be used to detect a situation where a carrier may be removed from the WTRU configuration, or may no longer be considered for addition to the WTRU configuration because its relative quality may be compared to that of another carrier may become too low. These examples include, but are not limited to, a serving cell metric on measurement object may become offset worse (e.g., lower) than a primary serving cell; a metric of a best cell on a measurement object may become offset worse than a primary serving cell; a serving cell metric on a first measurement object may become offset worse than a serving cell metric on a second measurement object; or a best cell metric on a first measurement object may become offset worse than a serving cell metric on a second measurement object. The use of these events may be configured by the network as part of the measurement configuration of the WTRU, for example.

Figure 3:
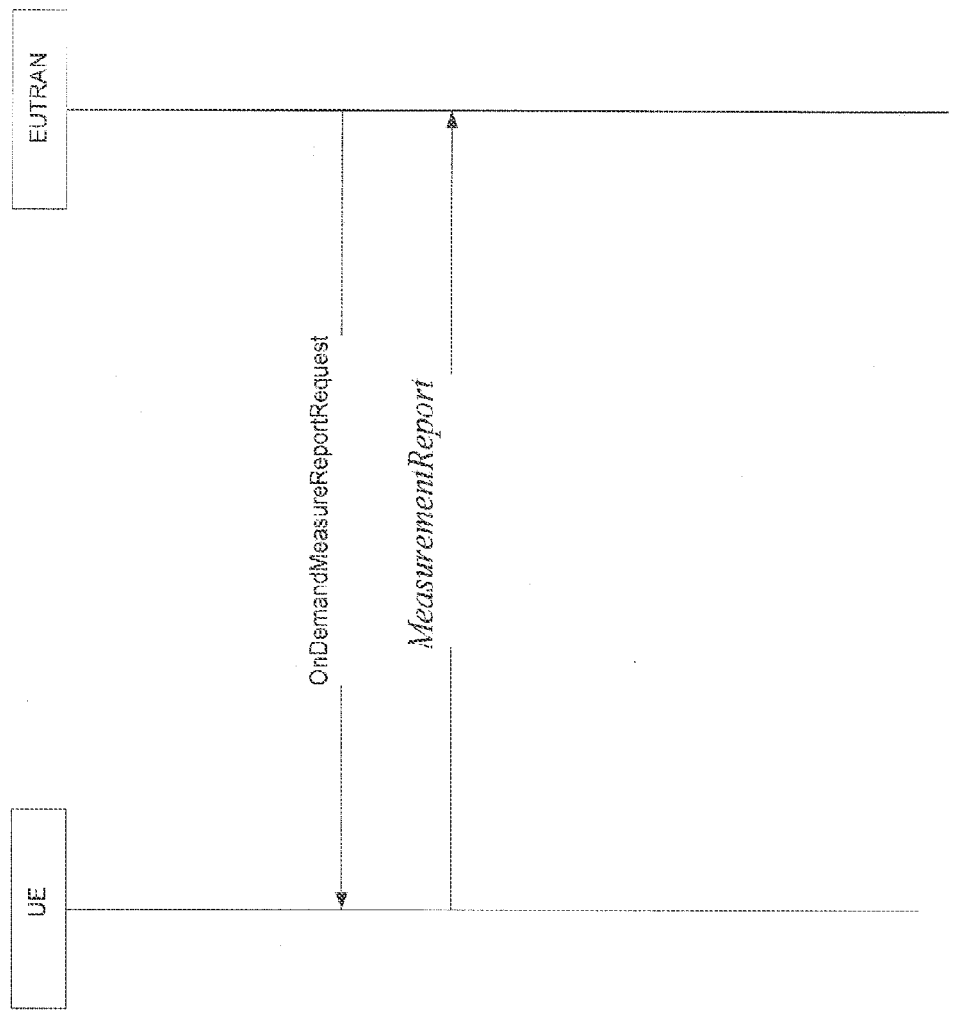
FIG. 3 is a block diagram of an exemplary on-demand measurement report.

Embodiments contemplate that on-demand measurement may be introduced to address issues of supporting handover to multiple carriers in the target cell and/or managing configuration and release of additional carriers. The network may request the measurement on its interested cells in a message, for example an on-demand measurement request, or by setting a field in an extended message. The message may be sent at a radio resource control (RRC) layer, as shown in FIG. 3, a media access control (MAC) layer or a physical (PHY) layer. Upon reception of this message, the WTRU may send a measurement report for the indicated carrier frequencies or measurement objects.

The following terminology may be used in the following examples. "Source configuration" may refer to the RRC configuration of the WTRU prior to the reconfiguration or re-establishment procedure. "Target configuration" may refer to the RRC configuration of the WTRU after the reconfiguration or re-establishment procedure, if the procedure may be successful. "Pcell" may refer to the serving cell on the primacy component carrier (PCC). "Scell" may refer to the serving cell on a secondary component carrier (SCC). "Scell-referred Event" may refer to a measurement event, such as but not limited to A1 or A2, whose serving cell reference may be an Scell. Embodiments contemplate that A1 may mean that a serving cell may become better than a threshold and A2 may mean that a serving cell may become worse than a threshold. All terms and accompanied definitions presented throughout this disclosure are for illustration purposes and other terms consistent with this disclosure may be reasonably used.

The following examples may be used to allow the WTRU to reconfigure its measurement configuration in preparation for any type of reconfiguration. The WTRU may remove a measID from its measurement configuration during an RRC Reconfiguration Procedure or an RRC Re-establishment Procedure, prior to performing the measurement configuration procedure, when at least one of a subset of the following conditions may be met. The conditions for removing a measId may include, but are not limited to, when: a) the measId is linked to a measObject corresponding to an SCC in the source configuration, b) the measId is linked to a measObject corresponding to an SCC in the source configuration but not to an SCC in the target configuration; c) the measId is linked to a measOjbect corresponding to an SCC in the source configuration but not to an SCC or PCC in the target configuration; d) the measId is linked to a measObject corresponding to an SCC in the source configuration and the Scell in the target configuration is not be identical to the Scell in the source configuration; e) the measId is linked to a reporting configuration corresponding to an Scell-referred Event; f) the measId is linked to a reporting configuration corresponding to an Scell-referred Event, and on a condition that (a) is true; g) the measId is linked to a reporting configuration corresponding to an Scell-referred Event, and on a condition that (b) is true; h) the measId is linked to a reporting configuration corresponding to an Scell-referred Event, and on a condition that (c) is true; i) the measId is linked to a reporting configuration corresponding to an Scell-referred Event, and on a condition that (d) is true; j) the measId is linked to a measOjbect corresponding to a non-configured CC in the source configuration; k) the measId is linked to a measObject corresponding to a non-configured CC in the target configuration; and/or l) the measId is linked to a measObject corresponding to a non-configured CC in the source configuration but to an SCC or PCC in the target configuration.

Embodiments contemplate that the removal the of measurement identity (measId), when one of the above conditions may be met, may occur (or perhaps in some embodiments may only occur (if at least one of a subset of the following additional conditions may be met; m) the measId is modified to be linked to a different measObject according to one or more the embodiments described in the following paragraphs, or n) the PCC frequency in the source configuration is different from the PCC frequency in the target configuration, for example, an inter-frequency handover.

The following examples may be used to allow the WTRU to reconfigure its measurement configuration in preparation for a reconfiguration that involves a change of PCC frequency in multi-carrier operation. For a measId that may already be linked to a first measObject, the WTRU may modify this measId so that it may instead be linked to a first measObject, the WTRU may modify this measID so that it may instead be linked to a second measObject during an RRC Reconfiguration Procedure and/or an RRC Reestablishment Procedure, prior to performing the measurement configuration procedure, for example. This may occur when the second measObject may already be part of the measurement configuration of the WTRU and when at least one of a subset of the following conditions may be met; o) the first measObject corresponds to the PCC in the source configuration and the second measObject correspond to the PCC in the target configuration, and the measId may be linked to a reporting configuration not corresponding to an Scell-referred Event; p) the first measObject corresponds to a PCC in the target configuration and an SCC in the source configuration, while the second measObject corresponds to the PCC in the source configuration and/or an SCC in the target configuration; or the first measObject corresponds to a PCC in the target configuration and/or a non-configured CC in the source configuration, while the second measObject corresponds to the PCC in the source configuration and/or a non-configured CC in the target configuration.

Embodiments contemplate conditional use of s-Measure for non-configured frequencies may be used to perform measurements. For example, the WTRU may measure on a non-configured frequency, for which at least one measId may be linked to the corresponding measObject, regardless of the configuration of s-Measure, if at least one of the following conditions is met. The conditions may include, but are not limited to, when the WTRU receives an indication from its measurement configuration to behave as such for measurements on this non-configured frequency; the multi-carrier WTRU is capable of adding at least one CC in its configuration; and/or the WTRU is capable of measuring on this non-configured frequency without using measurement gaps.

Figure 4:
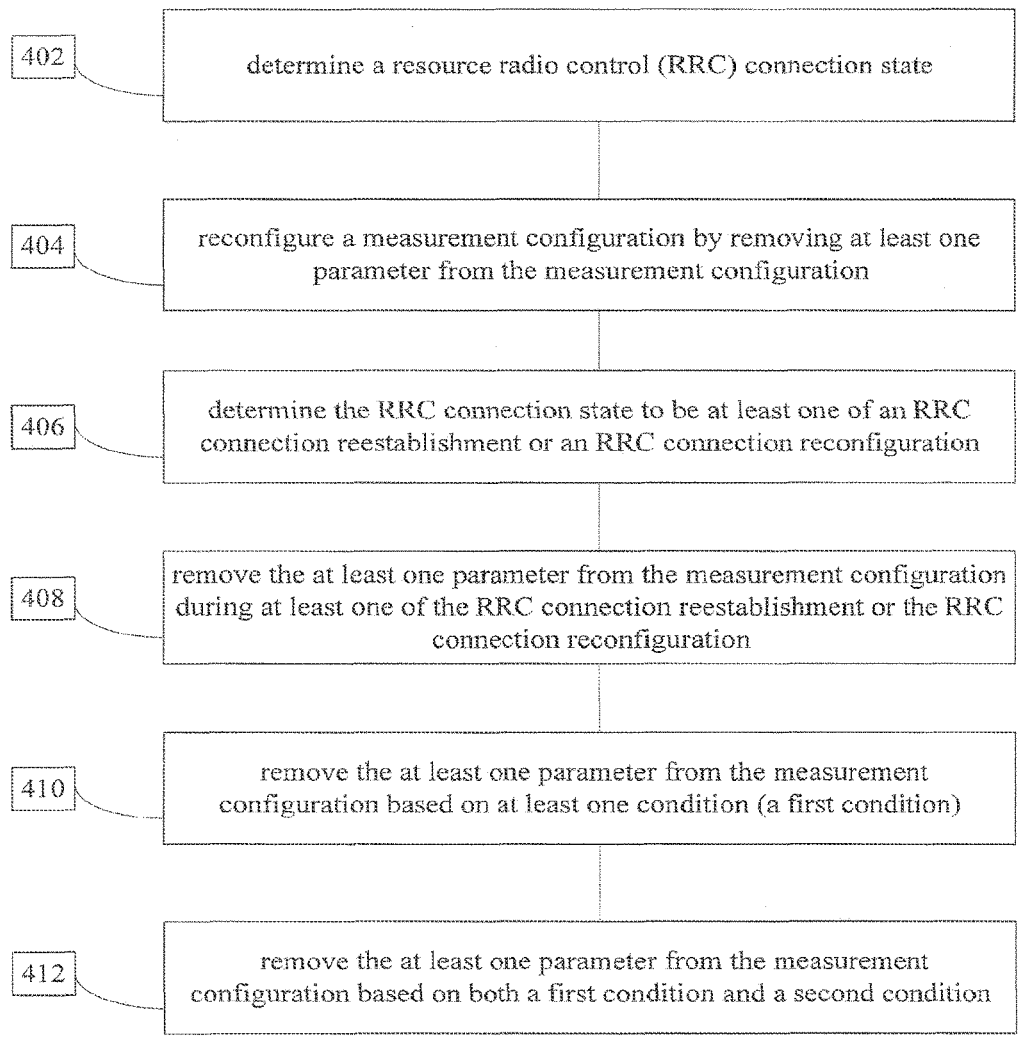
FIG. 4 is a block diagram of an exemplary measurement embodiment.

FIG. 4 illustrates an exemplary embodiment. As depicted in FIG. 4, at 402, a wireless transmit/receive unit (WTRU) may have one or more processors configured, at least in part, to determine a resource radio control (RRC) connection state. At 404, the WTRU may reconfigure a measurement configuration. The reconfiguration of the measurement configuration may include removing at least one parameter from the measurement configuration. At 406, the RRC connection state may be determined to be at least one of an RRC connection reestablishment or an RRC connection reconfiguration, for example. At 408, the WTRU may remove the at least one parameter from the measurement configuration during at least one of the RRC connection reestablishment or the RRC connection reconfiguration, for example. Alternatively, at 410, the WTRU may be further configured to remove the at least one parameter from the measurement configuration based on at least one condition. Embodiments contemplate that the at least one parameter may correspond to an identification parameter, such as an measId parameter, for example. Also, a first condition may include the measId parameter being associated with at least one of an A1 measurement event or an A2 measurement event, for example. At 412, the WTRU may be further configured to remove the at least one parameter form the measurement configuration based on both the first condition and a second condition. Embodiments contemplate that the second condition may include the measId parameter being associated with a measObject parameter corresponding to a non-configured component carrier (CC), for example.

Figure 5:
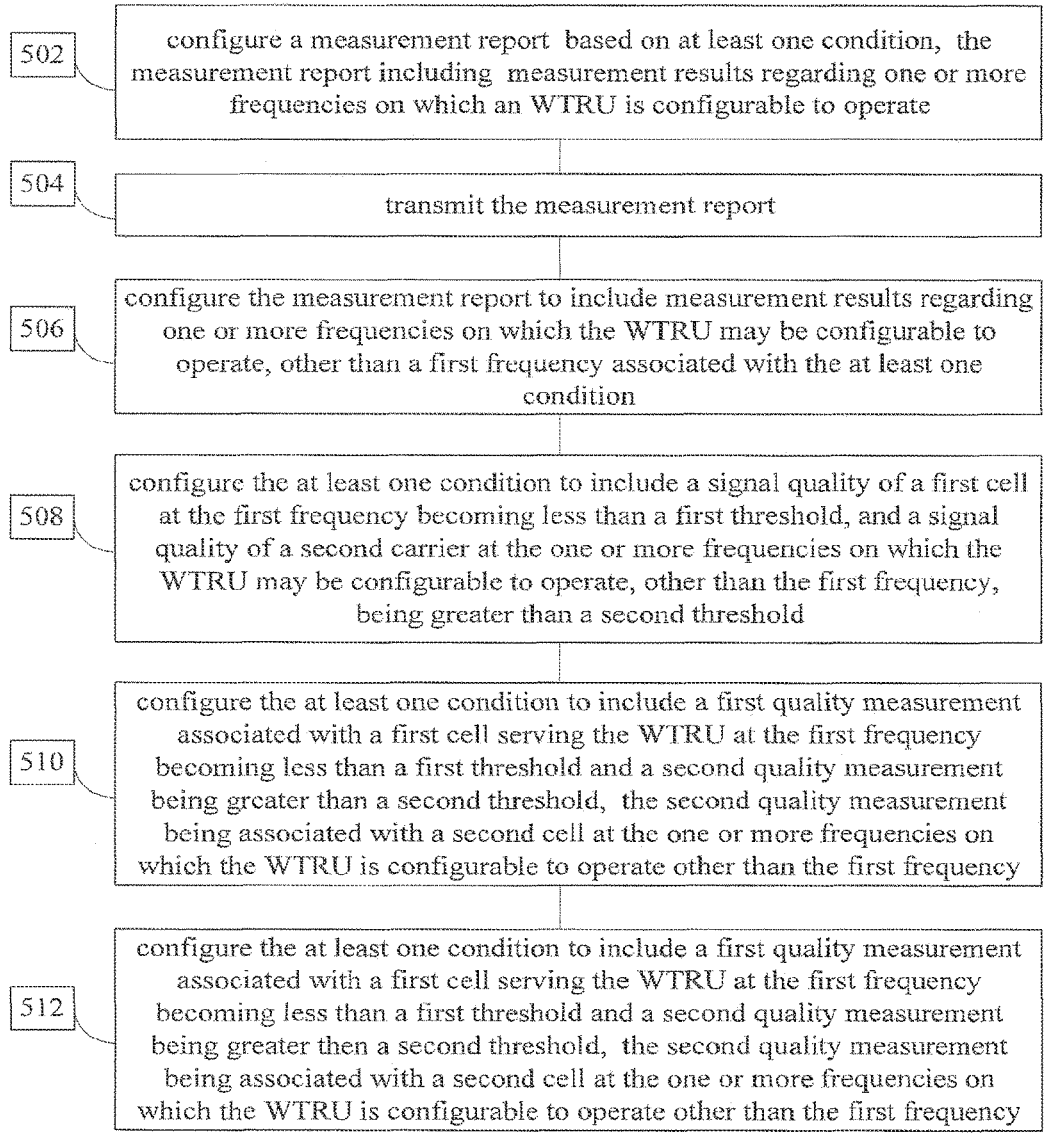
FIG. 5 is a block diagram of an exemplary measurement embodiment.

As depicted in FIG. 4 and FIG. 5A, embodiments contemplate a wireless transmit/receive unit (WTRU), that may comprise one or more processors. At 502, at least one processor of the WTRU (or simply the WTRU) may be configured, at least in part, to configure a measurement report. The management report may be configured based on at least one condition. The measurement report may include measurement results regarding one or more frequencies on which the WTRU may be configurable to operate. At 504, the WTRU may be configured to transmit the measurement report. At 506, the measurement report may include measurement results regarding one or more frequencies on which the WTRU may be configurable to operate, perhaps other than a first frequency. The first frequency may be associated with the at least one condition. At 508, the at least one condition may include a signal quality of a first cell at the first frequency becoming less than a first threshold. The at least one condition may also include a signal quality of a second cell at the one or more frequencies on which the WTRU may be configurable to operate, other than the first frequency, being greater than a second threshold.

Alternatively, at 510, the at least one condition may include a first quality measurement associated with a first cell serving the WTRU at the first frequency becoming less than a first threshold and a second quality measurement being greater than a second threshold. The second quality measurement may be associated with a second cell at the one or more frequencies on which the WTRU may be configurable to operate other than the first frequency.

Alternatively, at 512, the at least one condition may include a first quality measurement associated with a first cell at the first frequency becoming less than a first threshold and a second quality measurement being greater then a second threshold. The second quality measurement may be associated with a second cell at the one or more frequencies on which the WTRU may be configurable to operate other than the first frequency.

In another alternative, at 514, the at least one condition may include a first quality measurement associated with a first cell serving the WTRU at the first frequency becoming less than a second quality measurement associated with a second cell neighboring the first cell. The at least one condition may also include a third quality measurement being greater then a threshold. The third quality measurement may be associated with a third cell at the one or more frequencies on which the WTRU may be configurable to operate, other than the first frequency.

Again, alternatively, at 516, the at least one condition may include a first quality measurement associated with a first cell at the first frequency becoming less than a second quality measurement associated with a second cell neighboring the first cell. The at least one condition may also include a third measurement quality being greater than a threshold. The third measurement quality may be associated with a third cell at the one or more frequencies on which the WTRU may be configurable to operate, other than the first frequency.

Figure 6:
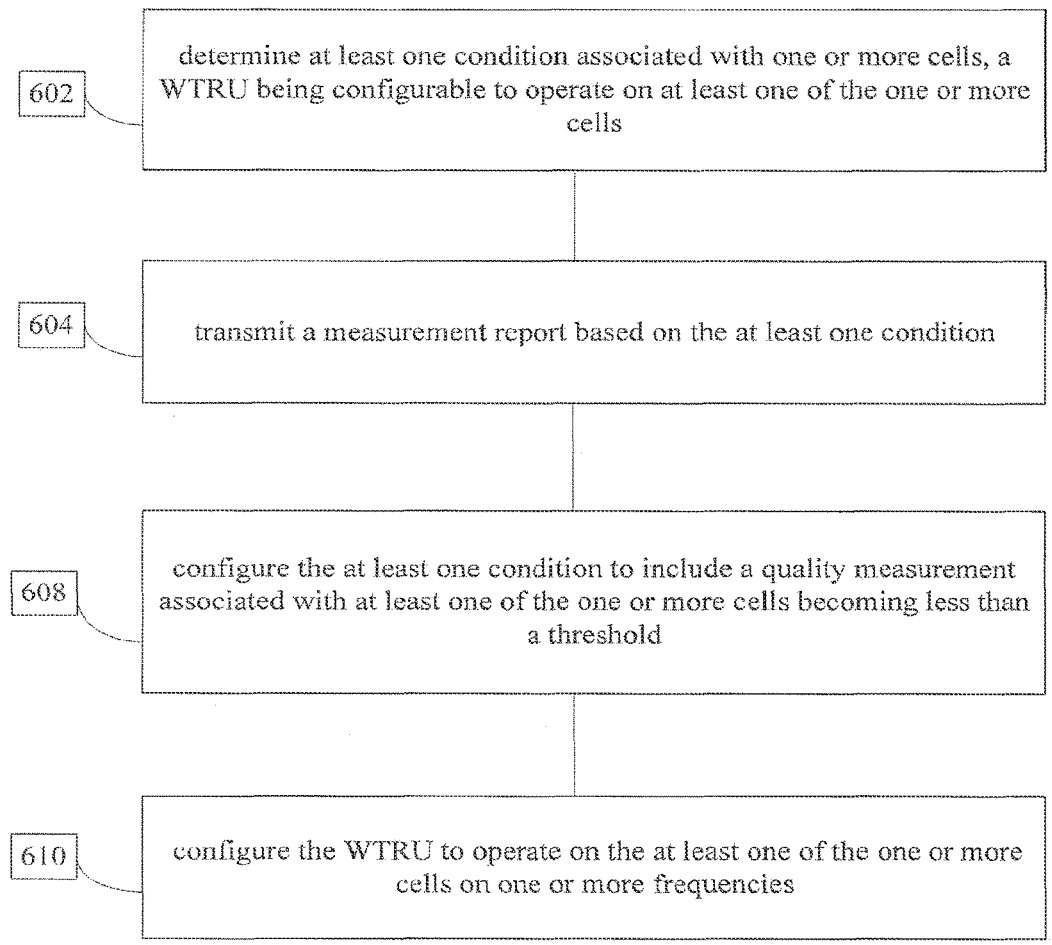
FIG. 6 is a block diagram of an exemplary measurement embodiment.

Referring now to FIG. 6, embodiments contemplate that a wireless transmit/receive unit (WTRU) may comprise one or more processors. AT 602, at least one processor of the WTRU (or imply the WTRU) may be configured, at least in part, to determine at least one condition that may be associated with one or more cells (or serving cells). The WTRU may be configurable to operate on at least one of the one or more cells. At 604, the WTRU may be configured to transmit a measurement report based on the at least one condition. At 606, the at least one condition may be configured to include a quality measurement associated with at least one of the one or more cells becoming less than a threshold. Embodiments contemplate that the threshold may be an absolute threshold. Also, the quality measurement may be at least one of a signal strength or a signal quality, for example. At 608, the WTRU may be configurable to operate on the at least one of the one or more cells on one or more frequencies. Embodiments contemplate that the one or more cells may include at least one of a primacy serving cell or a secondary serving cell, for example.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed is:

1. A wireless transmit/receive unit (WTRU), comprising:
a memory;
a processor, the processor configured, at least to:
configure a measurement configuration, the measurement configuration including a plurality of measId parameters, each of the plurality of measId parameters associated with at least one of a plurality of measObject parameters and at least one of a plurality of reportConfig parameters, each of the plurality of measObject parameters corresponding to a configured carrier, each of the plurality of reportConfig parameters corresponding to an event;
a receiver, the receiver configured, at least, to:
receive a resource radio control (RRC) connection message indicating at least one of an RRC connection reestablishment or an RRC connection reconfiguration,
the processor further configured, at least, to:
reconfigure the measurement configuration, the reconfiguration including:
a removal of a first measId parameter of the plurality of measId parameters from the measurement configuration during the at least one of the RRC connection reestablishment or the RRC connection reconfiguration, the first measId parameter associated with a first measObject parameter of the plurality of measObject parameters and a first reportConfig parameter of the plurality of reportConfig parameters, the configured carrier corresponding to the first measObject parameter becoming a non-configured carrier after an occurrence of the event corresponding to the first reportConfig parameter; and
a retention of a second measId parameter of the plurality of measId parameters in the measurement configuration during the at least one of the RRC connection reestablishment or the RRC connection reconfiguration, the second measId parameter associated with a second measObject parameter of the plurality of measObject parameters and a second reportConfig parameter of the plurality of reportConfig parameters, the configured carrier corresponding to the second measObject parameter remaining a configured carrier after the occurrence of the event corresponding to the first reportConfig parameter; and a transmitter, the transmitter configured, at least, to:
  transmit a measurement report generated based on the measurement configuration.

2. The WTRU of claim 1, wherein the event includes a measurement on a serving cell corresponding to at least one of: the configured carrier of the first measObject or the non-configured carrier of the first measObject.

3. The WTRU of claim 1, wherein the event is at least one of an A1 measurement event or an A2 measurement event.

4. The WTRU of claim 2, wherein the serving cell is at least one of a primary serving cell or a secondary serving cell.

5. The WTRU of claim 1, wherein the event further includes a signal quality of the configured carrier corresponding to the second measObject parameter being greater than a second threshold.

6. The WTRU of claim 1, wherein the event further includes a quality measurement being greater than a second threshold, the quality measurement associated with the configured carrier corresponding to the second measObject parameter.

7. The WTRU of claim 1, wherein the event further includes a first quality measurement associated with the configured carrier corresponing to the first measObject parameter becoming less than a first threshold, and a second quality measurement being greater than a second threshold, the second quality measurement associated with the configured carrier corresponding to the second measObject parameter.

8. A method performed by a wireless transmit/receive unit (WTRU), the method comprising:
  configuring a measurement configuration, the measurement configuration including a plurality of measId parameters, each of the plurality of measId parameters associated with at least one of a plurality of measObject parameters and at least one of a plurality of reportConfig parameters, each of the plurality of measObject parameters corresponding to a configured carrier, each of the plurality of reportConfig parameters corresponding to an event;
  receiving a resource radio control (RRC) connection message indicating at least one of an RRC connection reestablishment or an RRC connection reconfiguration;
  reconfiguring the measurement configuration, the reconfiguring including:
    removing at least one measId parameter of the plurality of measId parameters from the measurement configuration during the at least one of the RRC connection reestablishment or the RRC connection reconfiguration, the at least one measId parameter associated with a first measObject parameter of the plurality of measObject parameters and a first reportConfig parameter of the plurality of reportConfig parameters, the configured carrier corresponding to the first measObject parameter becoming a non-configured carrier after an occurrence of the event corresponding to the first reportConfig parameter; and
    retaining a second measId parameter of the plurality of measId parameters in the measurement configuration during the at least one of the RRC connection reestablishment or the RRC connection reconfiguration, the second measId parameter associated with a second measObject parameter of the plurality of measObject parameters and a second reportConfig parameter of the plurality of reportConfig parameters, the configured carrier corresponding to the second measObject parameter remaining a configured carrier after the occurrence of the event corresponding to the first reportConfig parameter; and
  transmitting a measurement report generated based on the measurement configuration.

9. The method of claim 8, wherein the event includes a measurement on a serving cell corresponding to at least one of: the configured carrier of the first measObject or the non-configured carrier of the first measObject.

10. The method of claim 8, wherein the event is at least one of an A1 measurement event or an A2 measurement event.

11. The method of claim 9, wherein the serving cell is at least one of a primary serving cell or a secondary serving cell.

12. The method of claim 8, wherein the event further includes a signal quality of the configured carrier corresponding to the second measObject parameter being greater than a second threshold.

13. The method of claim 8, wherein the event further includes a quality measurement being greater than a second threshold, the quality measurement associated with the configured carrier corresponding to the second measObject parameter.

14. The method of claim 8, wherein the event further includes a first quality measurement associated with the configured carrier corresponding to the first measObject parameter becoming less than a first threshold, and a second quality measurement being greater than a second threshold, the second quality measurement associated with the configured carrier corresponding to the second measObject parameter.

* * * * *